United States Patent
Moeller et al.

(10) Patent No.: US 10,668,859 B2
(45) Date of Patent: Jun. 2, 2020

(54) METHOD AND APPARATUS FOR COMMUNICATING VIDEO SIGNALS AND DATA BETWEEN A TRAILER AND A TOWING VEHICLE

(71) Applicant: VELVAC INCORPORATED, New Berlin, WI (US)

(72) Inventors: Mark M. Moeller, Everson, WA (US); Larry Piekarski, Russiaville, IN (US); David Wood, Bothell, WA (US); Mason Harwell, Bellingham, WA (US); Douglas Cullen Chamber, San Pedro, CA (US)

(73) Assignee: VELVAC INCORPORATED, New Berlin, WI (US)

(*) Notice: Subject to any disclaimer, the term of this patent is extended or adjusted under 35 U.S.C. 154(b) by 4 days.

(21) Appl. No.: 15/902,064

(22) Filed: Feb. 22, 2018

(65) Prior Publication Data
US 2018/0244200 A1  Aug. 30, 2018

Related U.S. Application Data

(60) Provisional application No. 62/463,311, filed on Feb. 24, 2017.

(51) Int. Cl.
| | |
|---|---|
| *B60R 1/00* | (2006.01) |
| *B60D 1/62* | (2006.01) |
| *H04N 7/18* | (2006.01) |
| *B60D 1/36* | (2006.01) |

(Continued)

(52) U.S. Cl.
CPC ............ *B60R 1/003* (2013.01); *B60D 1/36* (2013.01); *B60D 1/62* (2013.01); *H04N 5/247* (2013.01); *H04N 7/18* (2013.01); *B60D 1/64* (2013.01); *B60R 2300/105* (2013.01);

(Continued)

(58) Field of Classification Search
CPC combination set(s) only.
See application file for complete search history.

(56) References Cited

U.S. PATENT DOCUMENTS

| | | | | |
|---|---|---|---|---|
| 5,854,517 | A | * 12/1998 | Hines | ............... B60T 8/1708 |
| | | | | 307/10.8 |
| 8,619,950 | B1 | * 12/2013 | Feldstein | ............... H04N 7/108 |
| | | | | 379/88.13 |

(Continued)

OTHER PUBLICATIONS

Communication with Extended European search report dated Jun. 27, 2018, Application No. EP 18 15 8378.

*Primary Examiner* — Janese Duley
(74) *Attorney, Agent, or Firm* — Schiff Hardin LLP (57) ABSTRACT

A commercial trailer camera interface for providing an apparatus and method for connecting video cameras and data buses from a trailer to the tow vehicle. The trailer camera interface generally includes a nose box, which affixes to the front of the trailer, a tail box which affixes inside the rear of the tow vehicle, and an umbilical cable which connects the nose box to the tail box. The nose box encodes the video signals, for example as differential signals, for transmission over the umbilical cable and the tail box decodes the received encoded signals to recover the video signals. The nose box and the tail box may each include a plurality of video camera connectors. The tail box may include a video handler to display or record or stream the video signals.

19 Claims, 9 Drawing Sheets

(51) Int. Cl.
*H04N 5/247* (2006.01)
*B60D 1/64* (2006.01)

(52) U.S. Cl.
CPC ..... *B60R 2300/40* (2013.01); *B60R 2300/406* (2013.01); *B60R 2300/802* (2013.01)

(56) References Cited

U.S. PATENT DOCUMENTS

| | | | |
|---|---|---|---|
| 2003/0151663 A1* | 8/2003 | Lorenzetti | H04N 7/18 348/148 |
| 2009/0104813 A1* | 4/2009 | Chen | H01R 9/038 439/581 |
| 2016/0052453 A1* | 2/2016 | Nalepka | B60R 1/00 348/148 |
| 2017/0039782 A1* | 2/2017 | Moeller | B60R 11/04 |

\* cited by examiner

METHOD AND APPARATUS FOR COMMUNICATING VIDEO SIGNALS AND DATA BETWEEN A TRAILER AND A TOWING VEHICLE

CROSS REFERENCE TO RELATED APPLICATION

This application claims the benefit of U.S. Provisional Patent Application Ser. No. 62/463,311, filed Feb. 24, 2017, which is incorporated herein by reference.

BACKGROUND OF THE INVENTION

Field of the Invention

The present invention relates generally to a method and apparatus for communicating data including video data, and more specifically to a method and apparatus for communicating data including video data between a towing vehicle and a trailer being towed by the towing vehicle.

SUMMARY OF THE INVENTION

The present invention provides a method and apparatus for communicating signals, including video signals from a video camera, between a towing vehicle and a trailer being towed by the towing vehicle. In certain aspects, a system for video signal distribution is provided. In certain aspects, a commercial trailer camera interface provides connections for one or more video cameras and data buses between a trailer and a tow vehicle. Video data from the trailer may be viewed by the driver of the tow vehicle and may be recorded in the tow vehicle.

In certain examples, a video distribution system includes a nose box that is mounted near or at a front of the trailer and a tail box that is mounted at or in the tow vehicle. An umbilical cable connects the nose box to the tail box to provide communication of signals between the nose box and the tail box.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

In certain examples, a commercial trailer camera interface provides an apparatus and method for connecting video cameras and data buses from a trailer to the tow vehicle.

In certain examples, a commercial trailer camera interface utilizes a plug and cable that may include a standard type of plug and cable so that any of multiple different tow vehicles may be connected to any of multiple different trailers. In certain examples, in particular with trailers and tow vehicles used for commercial trucking.

In certain examples, a commercial trailer camera interface includes data bus connectivity from the trailer to the tow vehicle.

In certain examples, a commercial trailer camera interface is configured to be immune to electrical noise interference from the trailer or tow vehicle.

In certain example, a commercial trailer camera interface provides clean, protected power to the cameras on the trailer.

In certain examples, a commercial trailer camera interface provides a secure method and apparatus for moving data bus information between the trailer and tow vehicle.

In certain examples, a commercial trailer camera interface operates to automatically switch between one or more rear view tow vehicle cameras and one or more rear view trailer cameras when the trailer is connected to the tow vehicle.

In certain examples, a commercial trailer camera interface is operable to communicate video data generated by analog, digital or IP (internet protocol) cameras.

In certain examples, a commercial trailer camera interface includes a wireless connectivity option for communicating data wirelessly between the trailer and the towing vehicle.

Other examples of the present invention will become obvious to the reader and it is intended that these examples are within the scope of the present invention. This invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Various other aspects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Overview

In the following description of the drawings similar reference characters denote similar elements throughout the several views.

Figure 1:
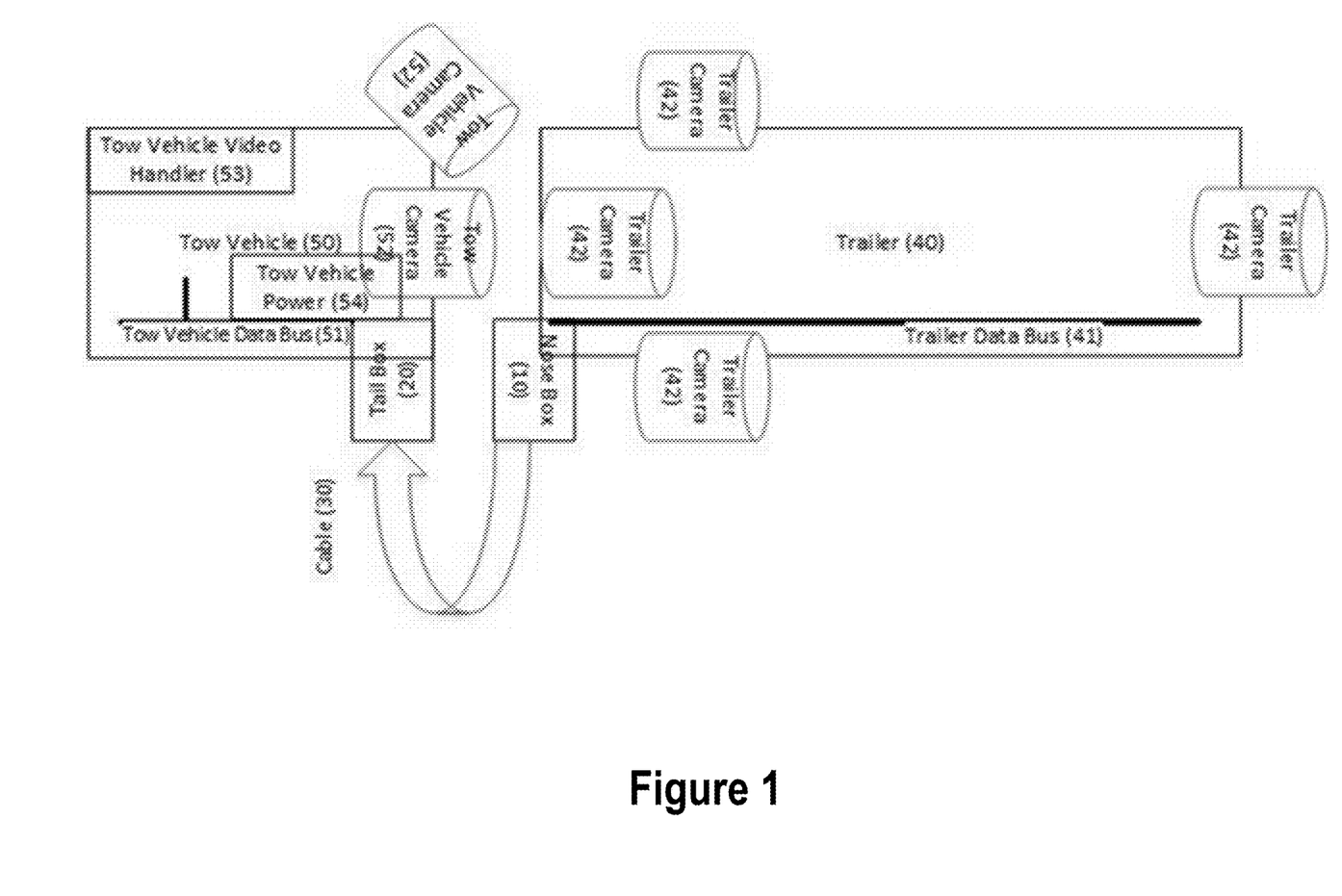
FIG. 1 is a functional block diagram of a tow vehicle and trailer having system including an interface connecting the tow vehicle and trailer.

With reference first to FIG. 1, a nose box 10 communicates with a tail box 20 via an umbilical cable 30. The nose box 10 is mounted on or in a trailer 40 and the tail box 20 is mounted in or on a tow vehicle 50. The trailer is provided with a trailer data bus 41 over which data is carried between the nose box 10 and one or more trailer cameras 42. In the example, a trailer camera 42 is mounted at the back of the trailer 40, two trailer cameras are mounted on the sides of the trailer 40, one at either side, and a fourth trailer camera is mounted at the front of the trailer 40. The rear camera and side cameras 42 may be directed rearwardly and the front camera directed in a forward direction. Other numbers, orientations and arrangements of cameras are of course possible. The cameras may provide wide angle, normal, or narrow views and may provide variable views as desired. The tow vehicle 50 includes a tow vehicle data bus 51 that can be connected to the tail box 20. The tow vehicle data bus 51 is also connected to one or more tow vehicle cameras 52, which may include a rearwardly directed tow vehicle camera 52 and a second tow vehicle camera 52 directed toward a passenger side of the tow vehicle 50. A tow vehicle video handler 53 may be mounted in the tow vehicle 50 and a tow vehicle power supply 54 may be provided to power some or all of the components of the system, including providing power to the trailer components via the umbilical cable 30 connected between the nose box 10 and the tail box 20.

In certain examples, the nose box 10 may be affixed to a front of the trailer 40 and the tail box 20 may be affixed inside the tow vehicle 50. The umbilical cable 30 is selectively connectable between the nose box 10 and the tail box 20 when the trailer 40 is connected to the tow vehicle 50 and may be disconnected when the trailer and tow vehicle are disconnected from one another.

Nose Box

Figure 2:
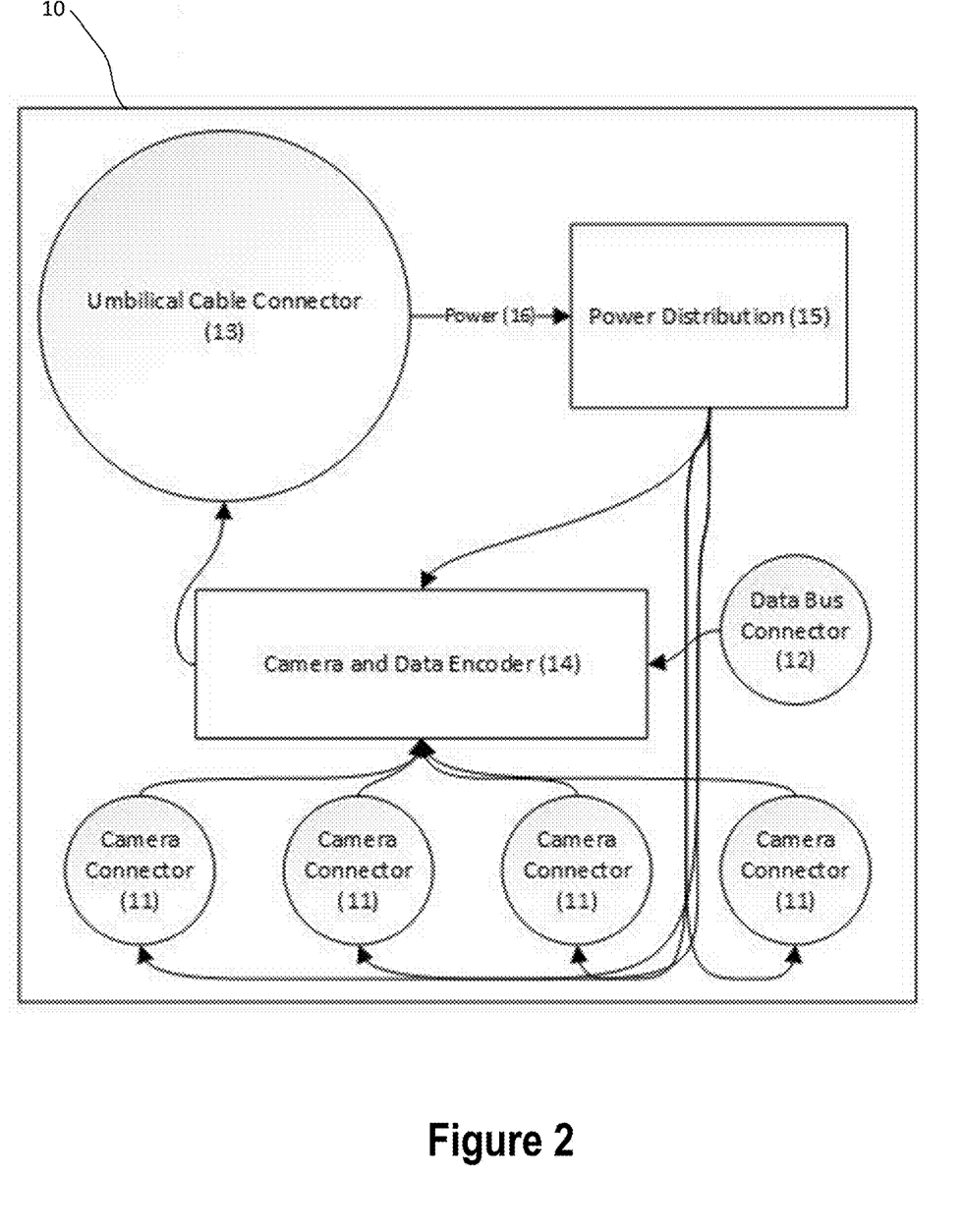
FIG. 2 is a functional block diagram of a nose box sub-component of the system for use on a trailer.

Turning to FIG. 2, the nose box 10 includes an enclosure that may be attached to a lower front of the trailer 40 so that the nose box 10 is easily accessible when the trailer 40 and tow vehicle 50 are joined to one another, in particular so that the umbilical cable 30 can be attached between the nose box 10 and the tail box 20. The nose box 10 contains a connector 13 for the umbilical cable 30, connectors 11 for the trailer cameras 42 and a connector 12 for the trailer data bus 41, as well as the electronics to manage all the signals. The electronics may include a camera and data encoder 14. The connector 13 in the nose box 10 for the umbilical cable 30 may be replaceable from outside the box should the connector become damaged. The nose box 10 can optionally contain an SAE J560 connector (not shown) for the trailer 40 as well to eliminate the need for separate interface boxes for the commercial trailer camera interface and the SAE J560. An SAE J560 connector connects the tail lights, brake lights and turn signals of the trailer to the light control system of the towing vehicle.

In the illustrated embodiment, the nose box 10 receives video signals via the camera connectors 11 from up to four trailer cameras 42 that are attached to the trailer 40. The cameras may be NTSC/PAL analog, serialized digital, or IP video cameras. The signals from the cameras are converted to differential signals suitable for the camera type by the camera and data encoder 14 and sent out on the umbilical cable connector 13. The differential signals may include encoded wave forms with two complementary signals. The complementary signals may be transmitted over pairs of conductors, such as over twisted wire pairs in the umbilical cable, and recovered at the receiving end as the electrical difference between the two signals. Noise signals that occur during the transmission of the differential signals are removed in the decoding process at the receiving end. The nose box 10 can also receive data from the trailer data bus 41. The data bus signals are encrypted and communicated to the umbilical cable connector 13. The nose box 10 receives its power over the umbilical cable 30 from the tail box 20 via a power signal 16. The power signal 16 is provided to a power distribution unit 15 that supplies electrical power to the camera and data encoder 14 and to the cameras via the camera connectors 11.

The nose box 10 of certain embodiments may have from 1 to 5 camera connectors 11. Other numbers of camera connectors are also possible and within the scope of this invention. The nose box 10 may or may not have a connector 12 for the trailer data bus 41. The nose box 10 may or may not be in the same enclosure as the trailer's J560 connector. The nose box 10 may only support one camera type or may support multiple types of cameras.

Tail Box

Figure 3:
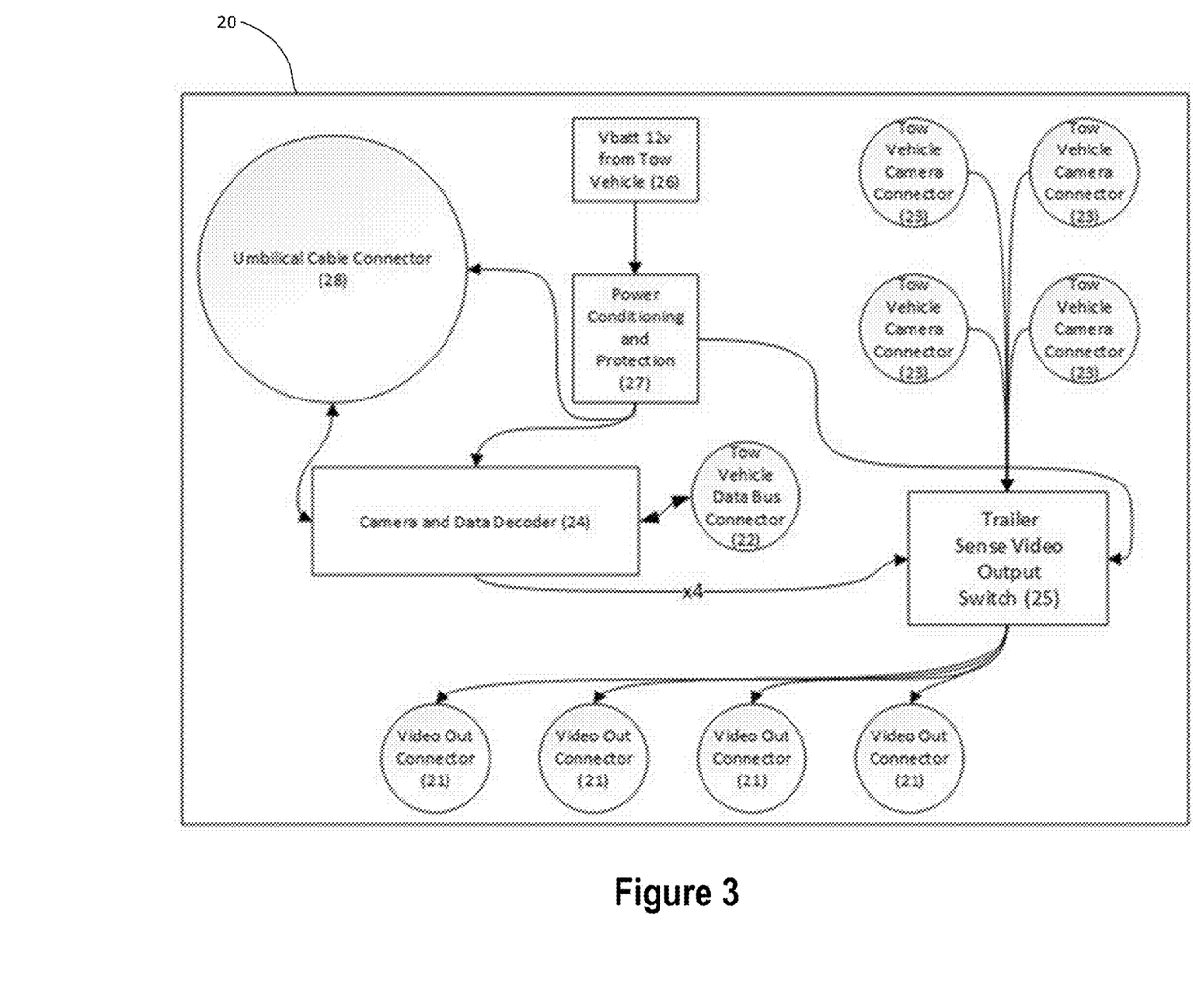
FIG. 3 is a functional block diagram of a tail box sub-component of the system for use on a towing vehicle.

In FIG. 3 is shown an example of the tail box 20 that is provided within an enclosure that attached to or inside the tow vehicle 50 at the rear of the tow vehicle 50. The enclosure may be an IP rated enclosure. The tail box 20 may include an umbilical cable connector 28 for connecting to the umbilical cable 30, or the umbilical cable 30 may be connected directly and permanently to the tail box 20. In the illustrated example, the tail box 20 contains the umbilical cable connector 28, a plurality of tow vehicle camera connectors 23, a plurality of video out connectors 21, a tow vehicle data bus connector 22, as well as the electronics to manage all the signals. The tail box 20 is also connected to the tow vehicle power supply 54 and contains electronics to condition and distribute that power to the tail box 20, nose box 10 and cameras 52, 42 that are attached to the system. In particular, the tail box 12 includes the 12 volt nominal power input 26 from the tow vehicle 50 and a power conditioning and protection apparatus 27 which is connected to the umbilical cable connector 28, the camera and data decoder 24 and the trailer sense video output switch 25.

In the illustrated example, the tail box 20 receives video signals via the tow vehicle camera connectors 23 from up to four video cameras 52 that are attached to or mounted on the tow vehicle 50. The cameras of certain embodiments are NTSC/PAL analog cameras, although other camera types are possible. The camera connectors 23 are connected internally within the tail box 20 to the trailer sense video output switch 25 that connects the tow vehicle camera connectors 23 to the video out connectors 21 on a one to one basis if the trailer 40 is not connected. If the trailer 40 is connected to the tail box 20, the encoded video signals from the nose box 10 are received over the umbilical cable connector 28. The received signals are converted from differential signals by the camera and data decoder 24 into NTSC, serialized digital video or IP video signals, depending on camera type, and sent out on the video out connector 21. The tail box 20 can also receive encrypted data over the umbilical cable connector 28. The signals are decrypted and put on the tow vehicle data bus 51 through the tow vehicle data bus connector 22. The signal is also used to determine what type of camera 51 is plugged into the nose box camera connectors 11 for proper conversion to the appropriate video output format. The tail box 20 receives its power from the tow vehicle power supply 54 where it connects to a Vbat 12 v from tow vehicle connector 26 then sends the power through the power conditioning and protection apparatus 27 before the tail box 20 uses the power and before the tail box 20 sends the power over the umbilical cable connector 28 to power the nose box 10.

The tail box 20 may or may not support trailer data bus 41 data. In certain examples, the tail box 20 may only support NTSC trailer cameras 42. In certain examples, the tail box 20 may be operable to output camera video other than NTSC video data, such as digital video data or IP camera data.

In a certain embodiment, the tail box 20 may only support one trailer camera 42 from the trailer 40. Other embodiments may support a plurality of trailer cameras 42. The tail box 20 may connect to a tow vehicle video handler 53, which may include a monitor, a DVR or other video recording means, or a live streamer to transmit the video as desired.

Umbilical Cable

Figure 8:
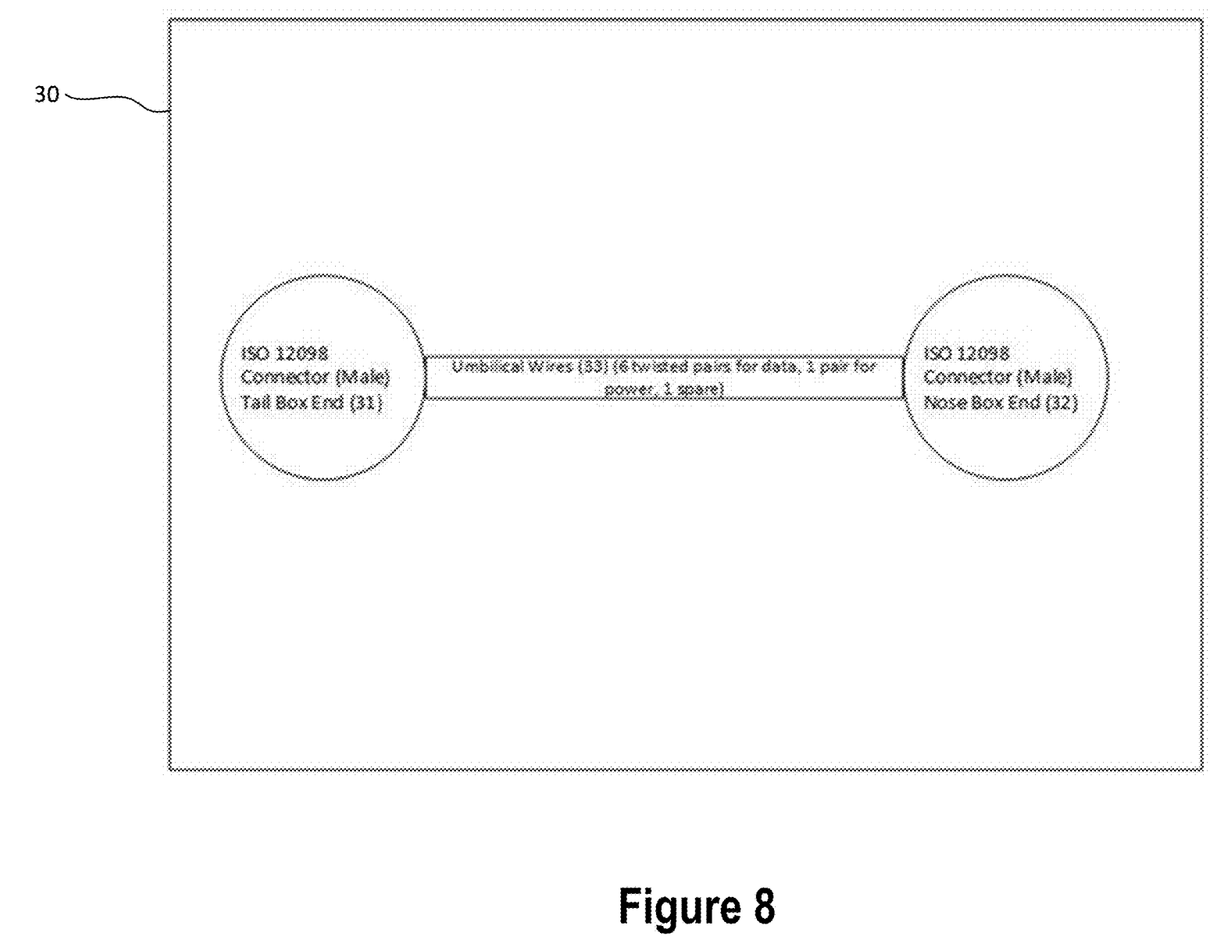
FIG. 8 is a functional block diagram of an umbilical cable for connecting a nose box to a tail box.

In FIG. 8, for example, the umbilical cable 30 includes connectors 31 and 32 at each end and includes either five or six twisted pairs of wire that are electrically balanced to work as differential pairs. The twisted pairs of wire are configured for carrying differential signals so that the signals can be recovered and any noise is removed. The cable can be constructed for durability suitable for its application.

In certain examples, the umbilical cable 30 is a ruggedized cable that connected the tail box 20 located on the tow vehicle 50 to the nose box 10 located on the trailer 40. The umbilical cable 30 uses ISO standard 12098 connectors 31 and 32 which support up to 15 umbilical wires 33. Up to 12 of the wires 33 are used in an impedance matched, twisted pair configuration for data to pass along. Another two are used for conditioned power to be passed from the tail box 20 to the nose box 10. A spare wire is reserved for future use.

In certain examples, the umbilical cable 30 can vary from one data pair and one power pair up to six data pairs and one power pair. The umbilical cable 30 may or may not contain a trailer data bus 42 pair. Missing or damaged conductors or poor connections are sensed by the tail box 20 so that any signal is erroneously generated by them is ignored. The tail box 20 can report erroneous signal conditions onto the tow vehicle data bus if desired.

Trailer

Returning to FIG. 1, the trailer 40 has the nose box 10 mounted on the trailer, in the trailer, or incorporated into the trailer. In the illustration, the trailer 40 may be a trailer for connecting to a semi-tractor to provide a tractor-trailer commercial vehicle for example. The trailer 40 represents any towable trailer that may have a data bus 41 in the trailer 40 and may have cameras 42 mounted on the trailer 40. The cameras 42 may provide a view behind the trailer 40, on the roadway or other area on either side of the trailer 40, and forward looking from the front of the trailer toward the tow vehicle 50. The image data from the cameras 42 is provided through the nose box 10 to the tail box 20 for viewing in the towing vehicle 50 by the driver for example on a display screen built into the tow vehicle 50 or on a portable electronic device such as a tablet computer in the tow vehicle 50. The video data may be recorded onto a recording device in the tow vehicle 50, for example, on a DVR in the tail box 20, on the portable electronic device, or onto another storage means. The trailer 40 may have vehicle monitoring and/or control systems that are connected to the nose box 10 by the trailer vehicle data bus 41 so that the monitoring and control data and the video or still image data from the trailer cameras 42 may be sent to the tail box 20 on the tow vehicle 50.

Tow Vehicle

A motor vehicle is used as the tow vehicle 50 for towing the trailer 40. The tow vehicle may be a semi-tractor, a truck, a pick-up truck, an SUV, an automobile, a motor home, a tow truck, agricultural or other vehicle. A fleet of semi-tractors or other vehicles may be equipped with the tail boxes for towing a fleet of trailers equipped with the nose boxes. The tow vehicle 50 has the tail box 20 mounted in the vehicle, on the vehicle, or otherwise attached.

In the illustration, the tow vehicle 50 represents any vehicle capable of towing a trailer 40. The tow vehicle 50 may have a tow vehicle data bus 51 and may have tow vehicle cameras 52 mounted on the tow vehicle 50. In the example, one camera is approximately at the center line of the vehicle and directed toward the trailer 40 and the other is directed from the side of the tow vehicle 50 toward the trailer 40. The second camera 52 may instead be directed to a roadway lane or other area at the passenger side of the tow vehicle 50. Other arrangements and numbers of cameras may be provided as well, including cameras on the hood, on the roof, on the rearview mirrors, or on other portions of the vehicle. The cameras may provide a view of the trailer 40 during hitching or connection of the tow vehicle and the trailer to one another and during towing of the trailer 40. For example, the tow vehicle cameras 52 may guide the driver into position during hitching or connection to the trailer 40 (for example using the Velvac $5^{th}$ wheel camera system). Once connected, the trailer cameras 42 provide views around and behind the trailer 40 to the driver during driving. The tail box 20 may be connected to the tow vehicle data bus 51 and the trailer cameras 52 to coordinate processing and display of the vehicle camera data with the trailer camera data. Tail box 20 on the tow vehicle 50 connects to the nose box 10 on the trailer 40 via the umbilical cable 30 when the trailer 40 is hitched to the tow vehicle 50 and may be connected when the trailer and vehicle are close but not hitched.

The tow vehicle 50 may or may not have tow vehicle cameras 52 or a tow vehicle data bus 51. A tow vehicle 50 may or may not have a tow vehicle video handler 53 such as a video monitor for display of the video data, a DVR or other recording means, or live streaming transmitter to transmit the data including the video data to a remote device.

Wireless Data Connection

Figure 4:
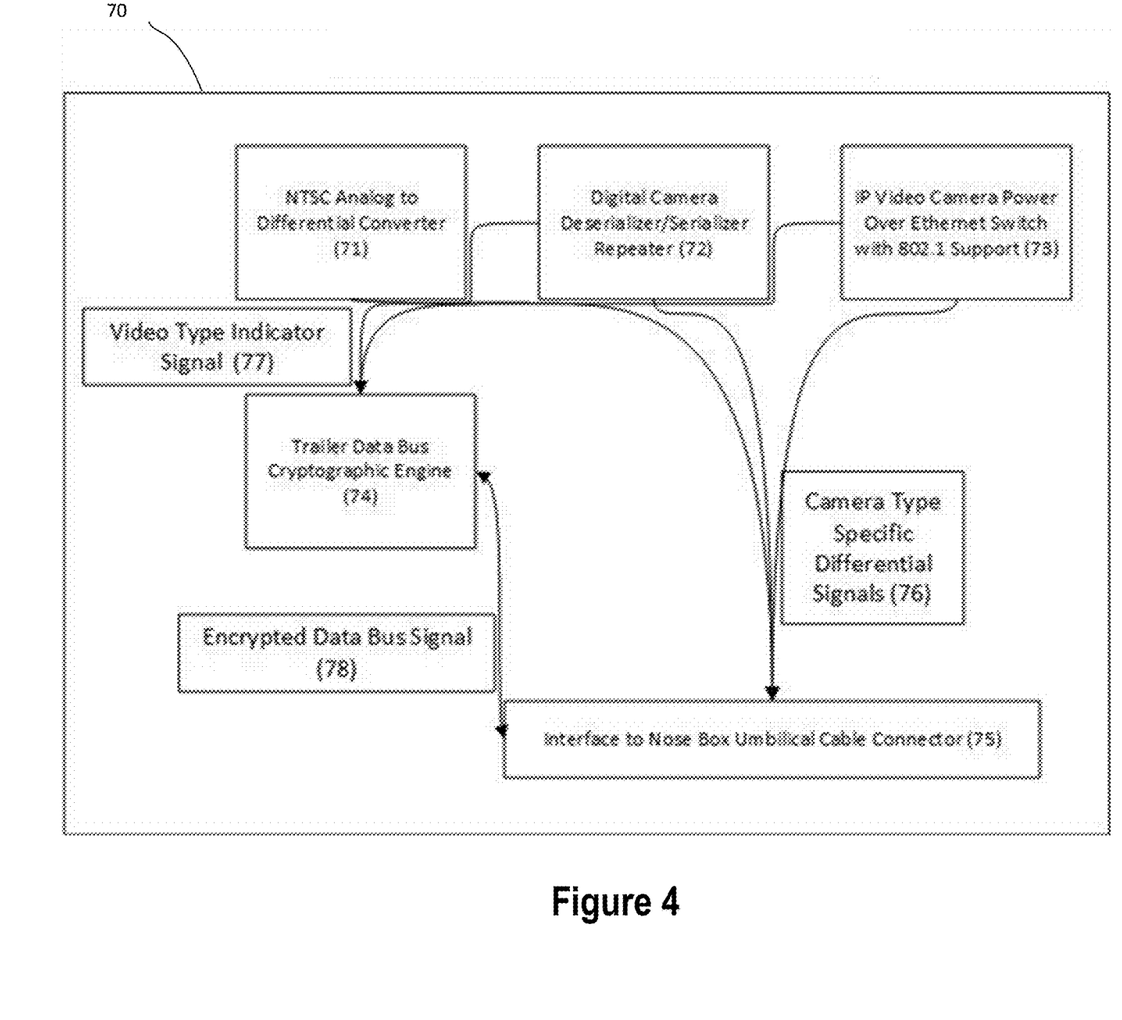
FIG. 4 is a functional block diagram of an encoder for use in a nose box sub-component of the system.
Figure 5:
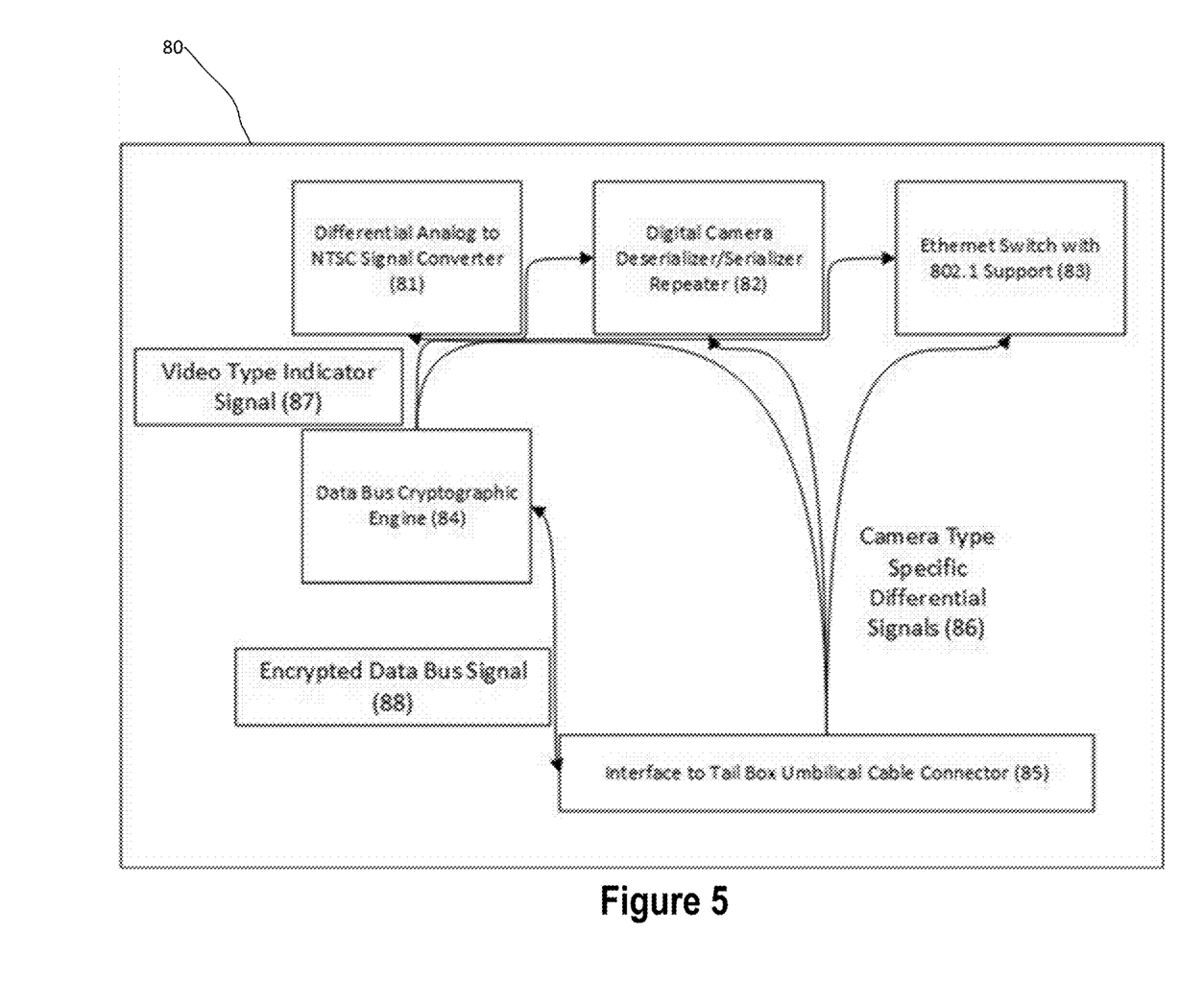
FIG. 5 is a functional block diagram of a decoder for use in a tail box sub-component of the system.
Figure 9:
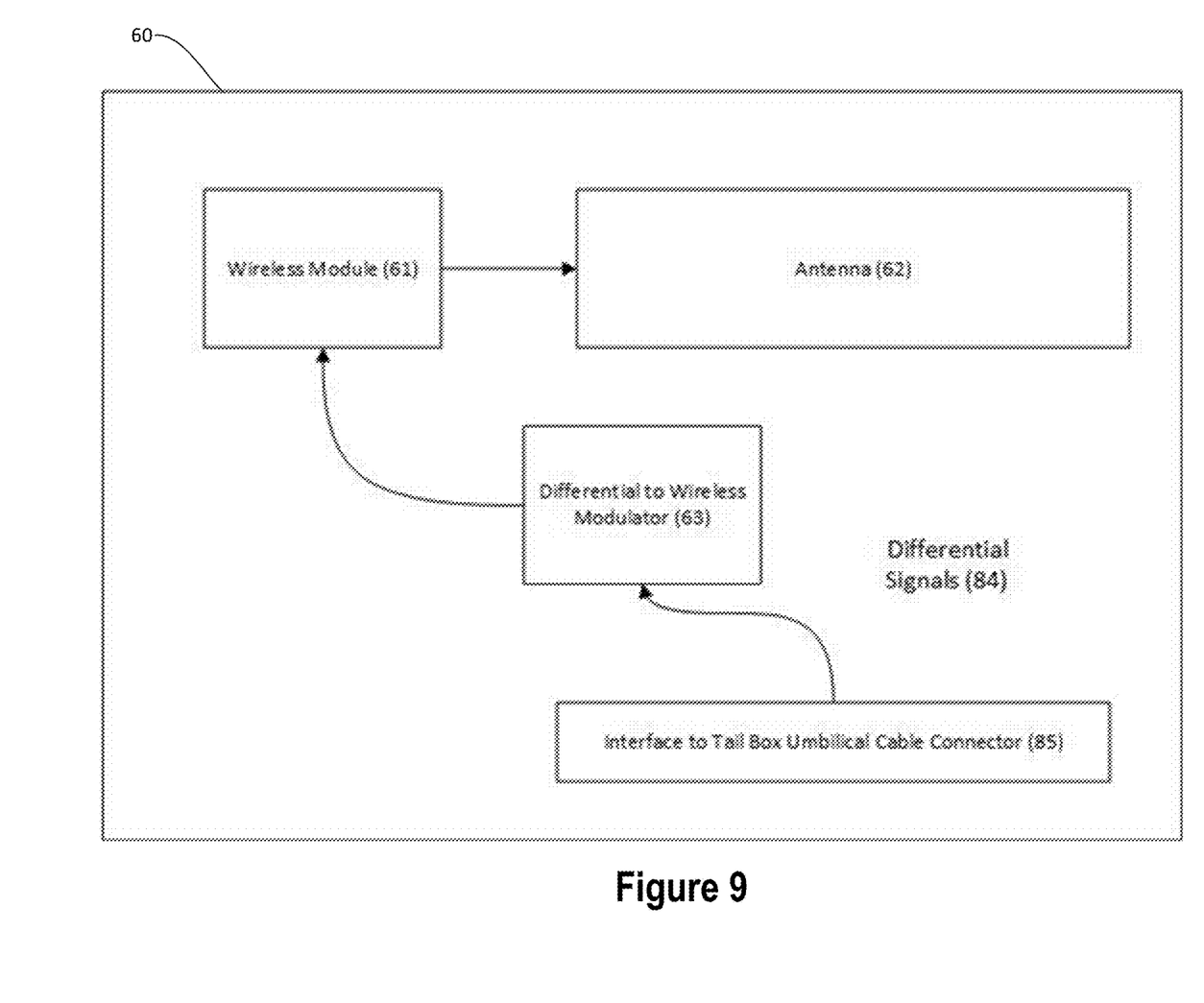
FIG. 9 is a functional block diagram of a wireless communication system for connecting the nose box to the tail box as an alternate embodiment.

Jumping to FIG. 9, a wireless data connection system 60 uses a wireless radio frequency communication technology, such as a WiFi communication system according to IEEE 802.11ad, to wirelessly communicate data between the nose box 10 and the tail box 20, for example. The figure may show the transceiver, for example, as utilized to transmit data from the nose box 10. A corresponding transceiver portion may be provided in the tail box 20 to receive the data and may be of a similar configuration. The wireless data connection system 60 includes a wireless module 61 to create a short range data connection from the interface to umbilical cable connector 75 (as shown in FIG. 4) of the nose box 10 to the interface to tail box 20 umbilical cable connector 85 (as shown in FIG. 5). The wireless communication system draws its power from the power provided over the connectors. In FIG. 9, the wireless data system 60 has a built in antenna 62 that is oriented toward the matching vehicle (toward the tow vehicle 50 from the trailer 40 or toward the trailer 40 from the tow vehicle 50) so that when the two vehicles are in proximity indicating a connection, the wireless data connection 60 automatically connects to its mate in the connected vehicle. When connected, a differential to wireless modulator 63 commences sending the signals from the interface to nose box umbilical cable connector 75 or the interface to tail box 20 umbilical connector 85 as if a physical cable was being used to connect the nose box 10 to the tail box 20. The wireless transceivers may use an encoding and decoding algorithm to avoid data loss and correct or detect errors, as is known, rather than using the differential signals in the wireless communication.

The wireless cable connection 60 is an optional module that replaces the umbilical cable 30 with an IEEE 802.11ad or other wireless technology radio module that converts the differential signals 64 from the interface to tail box/nose box umbilical connector 75 and 85 to a fault tolerant wireless signal such that the tail box 20 and nose box 10 appear to be connected via an umbilical cable 30 but in a completely wireless manner. In this configuration power must be supplied to the nose box 10 by the trailer 40 instead of the tail box 20. The antenna 62 and video and data to wireless modulator 63 are built into the wireless module 61.

As an optional sub-component, the wireless connector 60 is used for installations where no umbilical cable 30 is desired. While the tail box 20 and nose box 10 can remain basically unchanged (except where the nose box gets power), the wireless connector can be used to link data between the tail box 20 with the nose box 10.

The wireless technology used for this feature can be upgraded as wireless technology evolves. For purposes of this example, the IEEE 802.11ad technology is used because of its high bandwidth and resistance to noise interferences necessary to transmit video and data signals over short distances.

Nose Box Encoder Detail

With reference to FIG. 4, an example is shown of the electronic systems provided in the nose box video and vehicle bus data encoder 70. The encoder 70 converts the video data and vehicle bus data into a format that can be reliably and securely sent across the umbilical cable to the tail box. The encoder also provides firewall features to protect against gaining unauthorized access to the trailers data and camera systems through the external connectors on the nose box 10.

The nose box encoder 70 detail shows various signal flows through the nose box electronics to accomplish the nose box 10 side functionality. Video data arrives through one of three different video connection types from any an NTSC analog camera, a serialized digital camera, or an IP video camera. The video signal is processed by a corresponding video processor to turn the video signal into a differential electrical signal that can be passed through the umbilical cable 30. For NTSC video data, the encoder 70 includes an NTSC analog to differential converter 71, for serialized digital cameras there is a digital camera deserializer/serializer repeater 72, and for IP video data there is an IP video camera power over Ethernet switch 73 with 802.1 support. The encoder 70 may have any or all of the converters 71, 72, or 73, as desired. The differential video is sent to the interface to umbilical cable connector 75 as camera type specific differential signals 76. For NTSC cameras the differential signals could be provided via a simple single wire analog to differential pair converter, for digital video cameras this would be done with deserializer/serializer such as two TI 914/913 SERDES chips connected back to back, and for IP video data this could simple be an ethernet signal that brings together all IP video inputs for the nose box 11 and uses four of the umbilical wires 33 pairs. The video differential signal converters 71,72, and 73 also provide a signal to the trailer data bus cryptographic engine 74 indicating what camera type is being used to create the video, the signal being a type indicator signal 77. The trailer data bus cryptographic engine 74 then encodes that information along with the trailer data bus 41 data to pass the information to the tail box 20 using an encrypted data bus signal 78 over the interface to nose box umbilical cable connector 75. An example of a signal converter with cryptographic features that may be used is an HDBaseT converter (see www.h-dbaset.org) which allows both video and data to be encrypted and decrypted over the umbilical cable 75. Another technology that can be used to bring serialized or IP camera data from the trailer to across the umbilical cable 75 is 1000BaseT1 technology In its simplest form, the nose box encoder 70 may include the NTSC analog to differential converter 71 to provide a camera type specific differential signal 76 to the interface to umbilical cable connector 75.

Tail Box Decoder

Turning to FIG. 5, the decoder 80 of the tail box 20 may include the illustrated electronics systems. In certain examples, the tail box 20 video and vehicle bus data decoder 80 is operable to convert the encoded video and vehicle bus data back into a format that can be used by the video monitoring equipment on the tow vehicle and the tow vehicle's data bus.

The tail box decoder 80 detail shows how various signals flow through the tail box 20 electronics to accomplish the tail box 20 functionality. Signals arrive through the interface to tail box umbilical connector 85 in the form of camera type specific differential signals 86. The differential signals are then routed to the appropriate video decoder 81, 82, or 83. For NTSC a differential analog to NTSC signal converter 81 is used to generate NTSC video signals from the differential signals. For digital cameras a digital camera deserialize/serializer repeater 82 is used for the conversion. For IP video data an Ethernet switch with 802.1 support 83 is used for the conversion. The decoder 80 may have any or all of the decoders 81, 82 or 83, as desired. The appropriate video processor 81,82,83 is selected by the data bus cryptographic engine 84 based on information sent from the nose box 10 trailer data bus cryptographic engine 74 which drives the video type indicator signal 87. Further, encrypted data bus signal 88 is sent from the interface to tail box umbilical cable connector 85 to the data bus cryptographic engine 84 so that the trailer data bus 41 information is published (available) on the tow vehicle data bus 51.

Returning to FIG. 4, the Ethernet switch with 802.11ac support 73 may be connected to a data encoder that operates to encode the video signals and data bus data for communication via the 802.11 link, where it is decoded on the receiving side. Camera type specific signals may be transmitted. For NTSC cameras, the communication could be a simple single wire analog to differential pair converter, for digital cameras this would be done with a deserializer/serializer such as two TI 914/913 SERDES chips connected back-to-back, and for IP video this could simply be an Ethernet signal that brings together all IP video inputs for the nose box 11 and uses four of the umbilical wires 33 pairs. The video differential signal converters 71,72, and 73 also signal to the trailer data bus cryptographic engine 74 what camera type is being used. The trailer data bus cryptographic engine 74 then encodes that information along with the trailer data bus 41 data to pass to the tail box 20 using an encrypted data bus signal 78 over the interface to nose box umbilical cable connector 75.

The simplest form of the tail box 20 decoder 80 is a differential analog to NTSC signal converter 81 connecting to an interface to tail box umbilical cable connector 85 via a camera type specific differential signal 86 for NTSC video.

Connections of Main Elements and Sub-Elements of the System

Figure 6:
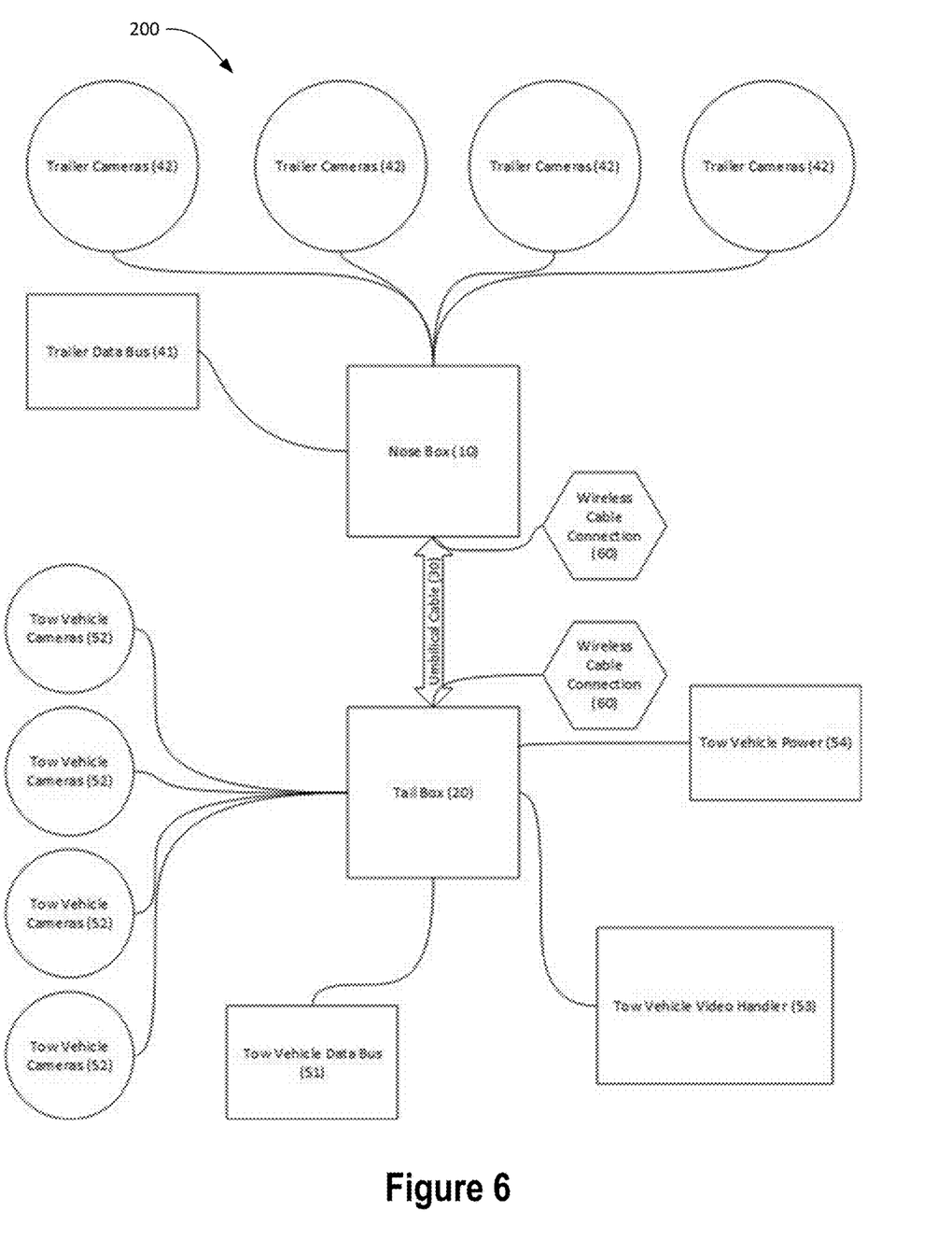
FIG. 6 is a functional block diagram of an example of a complete system.

With reference to FIG. 6, the system 200 is provided on the tow vehicle 50 and the trailer 40 as the tail box 20 mounted on the tow vehicle near where the trailer 40 would connect to the tow vehicle 50. The tail box 20 connects to the tow vehicle power system 54. The tow vehicle 50 may have one or more tow vehicle cameras 52 that connect to the tail box 20. The tow vehicle 50 may have a tow vehicle data bus 51 that may connect to the tail box 20. The data bus 51 may provide the video signals to a display in the vehicle for viewing by the driver, for example. The tail box 20 connects to the umbilical cable connector 28 which connects to the umbilical cable 30. The umbilical cable 30 connects to another umbilical cable connector 13 in the nose box 10. The nose box 10 connects to one or more trailer cameras 42 and optionally to a trailer data bus 41.

Alternative Embodiments

So far the system has been described as would be used with a single trailer and tow vehicle configuration. The communication interface as shown and described herein can be applied in a "daisy chained" way such that trailers for two or three trailer combos could be equipped with both nose boxes and tail boxes such that video signals could be carried forward from the rear most trailer through a series of nose boxes and tail boxes to communicate the video data and other information to the tow vehicle. In this configuration it may be desirable to have video of some of the cameras on the lead trailer sent to the tow vehicle and video data from some cameras on the rear trailer sent to the tow vehicle. This could be accomplished by adding additional switching intelligence to the tail box decoder detail 80 to allow the tow vehicle data bus 51 commands to be issued to the various tail boxes 20 in the series of trailers to control the switching of selected video signals. In addition, if the trailer has a vehicle diagnostic data bus in the trailer, the diagnostic data can be collected from the trailer(s) and sent to the tow vehicle.

Figure 7:
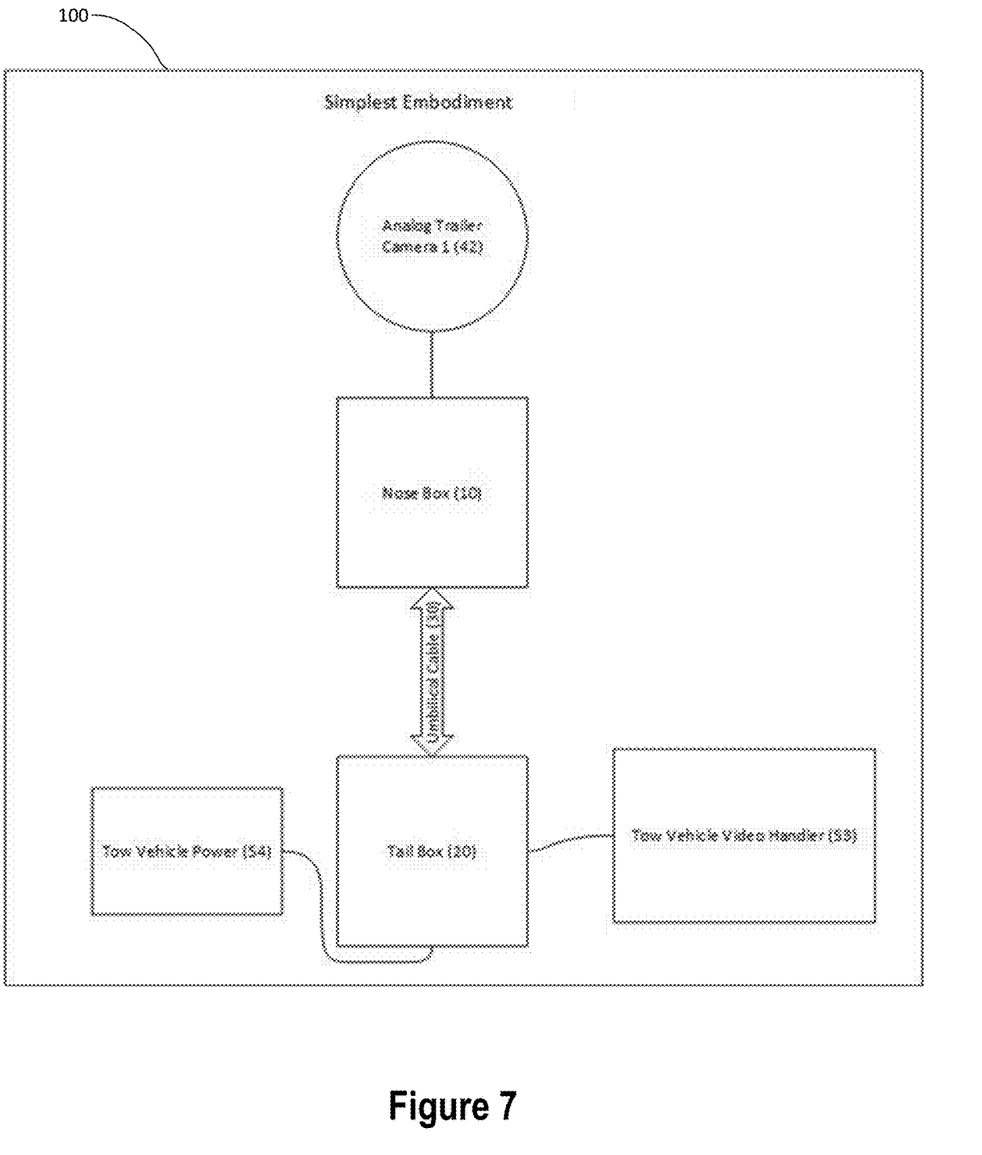
FIG. 7 is a functional block diagram of an alternative embodiment of a system for communicating data between a towing vehicle and a trailer.

While the system as shown and described herein is primarily targeted at commercial vehicle applications, it can also be used in passenger vehicle applications. FIG. 7 shows a simple embodiment 100 of the system having a reduced feature set that may be suited for use in a passenger vehicle. The simple embodiment 100 has an analog trailer camera 42 mounted on a trailer and connected to a nose box 10 at the front of the trailer. An umbilical cable 30 is connected to the nose box 10 on the trailer and to a tail box 20 on the towing vehicle, such as a passenger car or truck. The tail box 20 is connected to a tow vehicle power supply 54 for power and to a tow vehicle video handler 53. The video handler 53 may include a display screen such as the screen of a navigation system or screen of a portable electronic device that displays the video data communicated through the system from the trailer mounted camera 42. The simple system 100 may be provided with additional features, cameras, and capabilities as desired.

Operation of a Preferred Embodiment

In addition to the details above the following specifics should be noted for various system features.

In the tail box 20, the trailer sense video output switch 25 can be accomplished by using a circuit that monitors the amount of power being drawn by the nose box using a shunt resistor, differential amplifier and comparator. In the event that the tail box 20 measures the nose box 10 draw more than a specific amount of current, the tail box 20 will switch from the tow vehicle cameras 52 to the trailer cameras 42 as the source of video to output on the video out connectors 41.

In the nose box encoder 70 detail and tail box decoder 80 detail, the NTSC analog to differential converter 71 can be accomplished using a combination of the linear devices LT6552 and the analog devices ADA 4433-IBCP2. The digital camera deserializer/serializer repeater could be accomplished with core components including the TI FPD-LINK III LVDS serializer DS90UB933-Q1 and DS90USB934-Q1. The IP camera power over Ethernet switch with 802.1 support could be accomplished using the Marvell 88E6350R and the Linear LTC4266A. If 1000Base-T1 technology is used the Marvell 88Q2112 PHY transceiver can be used. If HDBaseT is desired, the Valens VA600T transceiver could be used.

Further, the trailer data bus cryptographic engine can be accomplished by establishing an Secure Socket Layer (SSL) connection over the umbilical wires 33 when connecting to the data bus cryptographic engine 84. This works because the cryptographic engines use a differential serial bus to talk with each other over the umbilical sires 33. The SSL connection performs a Certificate Authority validation as well to limit man-in-the-middle attacks.

Further, either the tail box or the nose box or both may contain a firewall on their data interfaces to prevent unauthorized access to the video or vehicle bus data via the external connectors on the tail box or nose box. The firewall may be configured to permit the tail box and nose box to communicate with one another but otherwise prevent access to data via the nose box or tail box.

The wireless communication connection 60 can be built around the Qualcomm Atheros QCA9008-SDB1 module with integrated antenna or other comparable modules.

See the complete system embodiment 200 for an overview of a complete version of the system. See the simplest embodiment 100 for the simplest version of the system.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

Although other modifications and changes may be suggested by those skilled in the art, it is the intention of the inventors to embody within the patent warranted hereon all changes and modifications as reasonably and properly come within the scope of their contribution to the art.

We claim:

1. A data interface between a trailer and a tow vehicle, comprising:
   a nose box configured for mounting at a front of the trailer, the nose box including:
      a nose box enclosure,
      a first umbilical connector at the nose box enclosure,
      a plurality of trailer video connectors at the nose box enclosure, the plurality of trailer video connectors being configured to connect to a plurality of trailer video cameras mounted at the trailer,
      an encoder in the nose box enclosure, the encoder being connected to receive a plurality of trailer video signals from the plurality of trailer video cameras connected to the plurality of trailer video connectors, the encoder being operable to encode the plurality of trailer video signals as a plurality of encoded trailer video signals, the encoder being connected to output the plurality of encoded trailer video signals at the first umbilical connector;
   a tail box configured for mounting at a rear of the tow vehicle, the tail box including:
      a tail box enclosure, a second umbilical connector at the tail box,
a decoder in the tail box enclosure, the decoder being connected to receive the plurality of encoded trailer video signals from the second umbilical connector, the decoder being operable to decode the plurality of trailer video signals encoded in the plurality of encoded trailer video signals, the decoder having a video signal output to output at least one of the plurality of decoded trailer video signals; and
a wired umbilical cable connected between the first umbilical connector at the nose box and the second umbilical connector at the tail box, the umbilical cable including a plurality of wire pairs being configured for carrying the plurality of encoded trailer video signals from the nose box in the trailer to the tail box in the tow vehicle, the umbilical cable being configured for carrying the encoded trailer video signals full time when connected between the nose box in the trailer and the tail box in the tow vehicle, the umbilical cable being separate from any cable connecting lighting and turn signal information between the trailer and the tow vehicle.

2. A data interface as claimed in claim 1, wherein the encoder is operable to generate a plurality of differential signals as the plurality of encoded trailer video signals;
wherein the plurality of wire pairs in the wired umbilical cable includes a wire pair for each of the plurality of differential signals generated in the nose box for transfer to the tail box; and
wherein the decoder is operable to decode the plurality of differential signals to recover the plurality of trailer video signals.

3. A data interface as claimed in claim 1, further comprising:
a video handler in the tail box enclosure and connected to the video signal output of the decoder, the video handler including an apparatus selected from the set comprising: a video monitor device configured for display of at least one of the plurality of decoded trailer video signals output by the decoder, a recorder configured to record at least one of the plurality of decoded trailer video signals output by the decoder, and a video transmitter configured to transmit at least one of the plurality of decoded trailer video signals output by the decoder to a remote device.

4. A data interface as claimed in claim 1, further comprising:
a power distributor in the nose box enclosure and connected to the first umbilical connector, the power distributor being configured to receive power from the tow vehicle via the umbilical cable, the power distributor having an output connected to the plurality of video connectors of the nose box.

5. A data interface as claimed in claim 1, further comprising:
a data bus connector at the nose box, the data bus connector configured for connection to a data bus of the trailer, the data bus connector being connected to the encoder.

6. A data interface as claimed in claim 5, wherein the encoder includes a trailer data bus cryptographic engine having an input connected to the data bus connector of the nose box and having an output connected to the first umbilical connector, the trailer data bus cryptographic engine being configured to encode trailer data bus data and to output the encoded trailer data bus data to the first umbilical connector.

7. A data interface as claimed in claim 1, further comprising:
a plurality of tow vehicle video connectors at the tail box, the plurality of tow vehicle video connectors being configured for connection to a plurality of tow vehicle video cameras mounted on the towing vehicle.

8. A data interface as claimed in claim 1, further comprising:
a tow vehicle data bus connector at the tail box, the tow vehicle data bus connector connected to the decoder.

9. A data interface as claimed in claim 1, further comprising:
a power conditioning circuit in the tail box, the power conditioning circuit having an input configured for connection to a power supply of the tow vehicle and having an output connected to the second umbilical connector and to the decoder.

10. A data interface as claimed in claim 1, wherein the encoder includes at least one of:
an NTSC analog to differential converter configured to convert analog video signals into differential electrical signals on a pair of outputs,
a digital camera deserializer/serializer repeater, and
an IP video camera power over Ethernet switch.

11. A data interface as claimed in claim 10, wherein the decoder includes at least one of:
a differential to NTSC analog converter,
a digital camera deserializer/serializer repeater, and
an Ethernet switch.

12. A camera interface as claimed in claim 1, further comprising:
a wireless connection to be used as an alternate to the umbilical cable to establish a data communication connection between the nose box and the tail box, the wireless connection being configured for carrying video and data signals between the nose box and the tail box.

13. A method of communicating a video signal from a trailer to a towing vehicle, comprising;
receiving a plurality of video signals at a nose box mounted on the trailer via a plurality of trailer video connectors at a nose box enclosure, the plurality of video signals being received from a plurality of trailer video cameras mounted at the trailer;
encoding the plurality of video signals in the nose box to generate a plurality of encoded video signals;
transmitting the plurality of encoded video signals from the nose box to a tail box mounted at the towing vehicle via an umbilical cable that is separate from any cable carrying light or turn signal information, the transmitting including transmitting each encoded video signal of the plurality of video signals over a corresponding twisted pair of wires in the umbilical cable;
decoding the plurality of encoded video signals in the tail box to obtain the plurality of video signals.

14. A method as claimed in claim 13, wherein the encoding includes generating a plurality of differential signals from the plurality of video signals for transmission from the nose box to the tail box, and
wherein the decoding include recovering the plurality of video signals from the differential signals received at the tail box.

15. A method as claimed in claim 13, further comprising:
receiving trailer data bus signals at the nose box; and
transmitting the trailer data bus signal from the nose box to the tail box via twisted pair wires in the umbilical cable.

16. A method as claimed in claim 13, wherein the transmitting includes transmitting the encoded video signal via the umbilical cable connected between the nose box and the tail box, the umbilical cable being separate from any cable carrying light and turn-signal information between the trailer and the tow vehicle.

17. A method as claimed in claim 13, wherein the transmitting includes transmitting the encoded video signal via the umbilical cable to the nose box mounted in a first trailer and further includes transmitting the encoded video signal wirelessly from a nose box in a second trailer to the tail box.

18. A data interface between a trailer and a tow vehicle, comprising:
- a nose box configured for mounting at a front of the trailer, the nose box including:
  - a nose box enclosure,
  - a first umbilical connector at the nose box enclosure,
  - a plurality of video connectors for connecting a plurality of video cameras at the nose box enclosure,
- an encoder in the nose box enclosure, the encoder being connected to receive a plurality of video signals from the plurality of video connectors and being operable to encode the plurality of video signals as a plurality of encoded video signals, the encoder being connected to output the plurality of encoded video signals at the first umbilical connector, the encoder is operable to generate a plurality of differential signals as the plurality of encoded video signals, the encoder includes at least one of:
  - an NTSC analog to differential converter,
  - a digital camera deserializer/serializer repeater, and
  - an IP video camera power over Ethernet switch;
  - a power distributor in the nose box enclosure and connected to the first umbilical connector, the power distributor having an output connected to the plurality of video connectors of the nose box;
  - a data bus connector at the nose box, the data bus connector configured for connection to a data bus of the trailer, the data bus connector being connected to the encoder;
- a tail box configured for mounting at a rear of the tow vehicle, the tail box including:
  - a tail box enclosure,
  - a second umbilical connector at the tail box,
  - a decoder in the tail box enclosure, the decoder being connected to receive the plurality of encoded video signals from the second umbilical connector, the decoder being operable to decode the plurality of video signals encoded in the plurality of encoded video signals, the decoder having a video signal output to output the plurality of decoded video signals, the decoder being operable to decode the plurality of differential signals to recover the plurality of video signals;
  - a video handler in the tail box enclosure and connected to the video signal output of the decoder, the video handler including an apparatus selected from the set comprising: a video monitor device configured for display of video data, a recorder configured to record the video data, and a video transmitter configured to transmit the video data to a remote device;
  - at least one video connector at the tail box, the at least one video connector being configured for connection to a video camera mounted on the towing vehicle;
  - a tow vehicle data bus connector at the tail box, the tow vehicle data bus connector connected to the decoder;
  - a power conditioning circuit in the tail box, the power conditioning circuit having an input configured for connection to a power supply of the tow vehicle and having an output connected to the second umbilical connector and to the decoder;
- a wired umbilical cable connected between the first umbilical connector at the nose box and the second umbilical connector at the tail box, the umbilical cable being configured for carrying the encoded video signal from the nose box to the tail box; and
- a wireless connection to be used as an alternate to the umbilical cable to establish a data communication connection between the nose box and the tail box, the wireless cable connection being configured for carrying video and data signals between the nose box and the tail box.

19. A data interface as claimed in claim 18, further comprising:
- a firewall operable to block unauthorized access to data via the nose box; and
- a firewall operable to block unauthorized access to data via the tail box.

* * * * *